(12) United States Patent
Shmelev et al.

(10) Patent No.: US 11,916,959 B2
(45) Date of Patent: Feb. 27, 2024

(54) SYSTEMS AND METHODS FOR BUILDING A HONEYPOT SYSTEM

(71) Applicant: AO Kaspersky Lab, Moscow (RU)

(72) Inventors: Yaroslav A. Shmelev, Moscow (RU); Demeter Dan, Moscow (RU); Preuss Marco, Moscow (RU); Mikhail Y. Kuzin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 119 days.

(21) Appl. No.: 17/645,530

(22) Filed: Dec. 22, 2021

(65) Prior Publication Data

US 2022/0294822 A1    Sep. 15, 2022

(30) Foreign Application Priority Data

Mar. 15, 2021  (RU) .......................... RU2021106663

(51) Int. Cl.
    *H04L 9/40* (2022.01)
(52) U.S. Cl.
    CPC ................ *H04L 63/1491* (2013.01)
(58) Field of Classification Search
    CPC ............... H04L 63/1491; G06F 21/50
    See application file for complete search history.

(56) References Cited

U.S. PATENT DOCUMENTS

| | | | |
|---|---|---|---|
| 7,694,339 B2 | 4/2010 | Blake et al. | |
| 8,181,250 B2 | 5/2012 | Rafalovich et al. | |
| 9,473,520 B2 | 10/2016 | Dixon et al. | |
| 9,495,180 B2 | 11/2016 | Ismael et al. | |
| 9,602,536 B1 | 3/2017 | Brown | |
| 9,716,727 B1 * | 7/2017 | Seger .................. | H04L 63/1491 |
| 9,906,538 B2 | 2/2018 | Zeitlin et al. | |
| 10,015,198 B2 | 7/2018 | Ettema et al. | |
| 10,110,629 B1 | 10/2018 | Kruse et al. | |
| 10,454,969 B2 | 10/2019 | Haerterich et al. | |
| 10,826,939 B2 | 11/2020 | Hodgman et al. | |

(Continued)

FOREIGN PATENT DOCUMENTS

EP         3057283         8/2016

OTHER PUBLICATIONS

Marcin Nawrocki et al: "A Survey on Honeypot Software and Data Analysis", arxiv.org, Cornell University Library, 201 Olin Library Cornell University Ithaca, NY 14853, Aug. 22, 2016 (Aug. 22, 2016), XP080721623.

(Continued)

*Primary Examiner* — Joseph P Hirl
*Assistant Examiner* — Thomas A Gyorfi
(74) *Attorney, Agent, or Firm* — ArentFox Schiff LLP; Michael Fainberg

(57) ABSTRACT

Systems and methods for building systems of honeypot resources for the detection of malicious objects in network traffic. A system includes at least two gathering tools for gathering data about the computer system on which it is installed, a building tool configured for building at least two virtual environments, each including an emulation tool configured for emulating the operation of the computer system in the virtual environment, and a distribution tool configured for selecting at least one virtual environment for each computer system and for establishing connection between the computer system and the virtual environment.

21 Claims, 5 Drawing Sheets

(56) References Cited

U.S. PATENT DOCUMENTS

| | | | |
|---|---|---|---|
| 10,992,704 | B2 | 4/2021 | Ettema et al. |
| 11,050,787 | B1* | 6/2021 | Sharifi Mehr ...... G06F 9/45558 |
| 2002/0046351 | A1 | 4/2002 | Takemori et al. |
| 2004/0078592 | A1 | 4/2004 | Fagone et al. |
| 2014/0096229 | A1 | 4/2014 | Burns et al. |
| 2018/0198822 | A1 | 7/2018 | Brown, Jr. et al. |
| 2020/0336510 | A1 | 10/2020 | Li et al. |
| 2021/0194853 | A1* | 6/2021 | Xiao ................... H04L 63/0281 |

OTHER PUBLICATIONS

Artail H. et al: "A hybrid honeypot framework for improving intrusion detection systems in protecting organizational networks", Computers & Security, Elsevier Science Publishers. Amsterdam, NL, vol. 25, No. 4, Feb. 17, 2006 (Feb. 17, 2006), pp. 274-288, XP027896439, ISSN: 0167-4048 [retrieved on Jun. 1, 2006].

European Search Report corresponding to EP 22161783.0, dated Aug. 5, 2022.

\* cited by examiner

SYSTEMS AND METHODS FOR BUILDING A HONEYPOT SYSTEM

CROSS-REFERENCE TO RELATED APPLICATION

The present application claims priority to Russian Application No. RU2021106663 filed Mar. 15, 2021, which is hereby fully incorporated herein by reference.

TECHNICAL FIELD

The present disclosure relates to data analysis, and more specifically to systems and methods for building honeypot systems and detection of malicious objects.

BACKGROUND

Rapid development of computer technologies in the last decade, along with a wide spreading of various computing devices (personal computers, notebooks, tablets, smartphones, etc.) has become a powerful incentive to use such devices in a number of technical areas and for a large number of tasks (from Internet surfing to bank transfers and electronic document/record keeping). In parallel with the growth of the number of computer devices and the volume of software operating on such devices, the number of malicious programs has also grown rapidly, as have the methods for unauthorized access to the data processed by such devices and the fraudulent methods for using such data.

Currently, there are a large number of types of malicious programs. Some malicious programs steal personal and confidential data from user devices (e.g. logins and passwords, banking information, electronic documents). Others build so-called botnets from user devices for such attacks on computer systems as DDoS (Distributed Denial of Service), or for cracking of passwords using a brute force method. Still others offer users paid content through intrusive advertising, paid subscriptions, and texting to toll numbers, etc.

To counter malicious programs, including the detection of malicious programs and prevention of infection and restoration of the functionality of computer devices infected with malicious programs, specialized anti-virus programs are utilized. For the detection of the various types of malicious programs, anti-virus programs use various technologies, such as: statistical analysis, signature analysis, lists of authorized and prohibited applications and addresses, dynamic analysis, and heuristic analysis, proactive protection, etc.

In order to efficiently detect malicious program technologies, in particular, and malicious activity, in general, it can be necessary to obtain new samples of malicious programs or malicious activity logs. This task is well handled by special systems—honeypots— which are specially tuned computer systems with active vulnerabilities representing convenient targets for malicious attacks.

One of the drawbacks of honeypots is that they often require separate computers, significant computing resources, or complex setup and control, which can complicate their use for tasks related to information security.

For example U.S. Pat. No. 9,906,538 describes a technology for detecting network attacks using honeypot systems (honeypot resources). For this purpose, on a specifically dedicated computer system, a system is built, which facilitates a network-based attack on it by preparing relevant honeypots (files and software representing targets for a network-based attack). Detection of network-based attacks becomes possible because the state of the computer system is known in advance, before it begins functioning as a honeypot. In this manner, changes in the file system and in the activity of the software on the computer system are tracked, including the activity of malicious applications or any activity related to network-based attacks.

While the above-mentioned technologies successfully handle the building of a honeypot environment for detection of malicious programs, they build said honeypot environments on assigned computer devices, thereby reducing the effectiveness of their work on other tasks, and even often prevent such work (e.g. a user cannot safely work on a computer system serving as a honeypot for malicious programs).

Therefore, there is a need to build honeypots for malicious programs and other malicious objects (honeypot resources) without significantly limiting the functionality of computer systems serving as such honeypots.

SUMMARY

Embodiments solve the aforementioned needs of the industry. In general, embodiments described herein implement data analysis to build systems of honeypot resources. The technical result of this disclosure includes building a system of honeypot resources for the detection of malicious objects in network traffic.

In an embodiment, a system for building a honeypot environment, the system comprising a first computing device including a first gathering tool, the first gathering tool configured to collect data about the first computing device; a second computing device including a second gathering tool, the second gathering tool configured to collect data about the second computing device, wherein the second computing device is independent of the first computing device; a building tool configured to: build a plurality of virtual environments, wherein each virtual environment includes an emulator configured to emulate at least one of the first computing device or the second computing device based on the data collected about the first computing device or the data collected about the second computing device, and transfer data about the built plurality of virtual environments to a distribution tool; the distribution tool configured to: select at least one of the plurality of virtual environments for association with the first computing device based on data about the plurality of virtual environments, select at least one of the plurality of virtual environments for association with the second computing device based on data about the plurality of virtual environments, and establish connections between the computing devices and the respective virtual environments associated with the computing devices.

In an embodiment, a method for building a honeypot environment comprise collecting data about a computing system; selecting at least one of a plurality of pre-built virtual environments for association with the computing system based on the data collected about the computing system, each of the pre-built virtual environments including an emulator configured to emulate the computing system; intercepting network traffic of the computing system; emulating the computer system in the selected at least one of the plurality of pre-built virtual environments using the emulator; and detecting at least one malicious object from the intercepted network traffic based on the emulating.

In an embodiment, a system for building a honeypot environment comprises: a virtual environments database configured to store a plurality of previously-built virtual environments; a distribution model including a plurality of characteristics selected by at least one machine learning method; computing hardware of at least one processor and a memory operably coupled to the at least one processor; and instructions that, when executing on the computing hardware, cause the computing hardware to implement: a building tool configured to: build a plurality of virtual environments, wherein each virtual environment includes an emulator configured to emulate at least one computing system, and train the distribution model based on the plurality of previously-built virtual environments, and a distribution tool configured to select at least one of the plurality of virtual environments for association with a respective computing system based on the distribution model.

Such results are achieved by using a system for building honeypot resources, which includes at least two gathering tools; each of the gathering tools is installed on a separate computer system and configured for gathering data about the computer system on which it is installed and for sending the gathered data to the building tool and to the distribution tool; a building tool, configured for building at least two virtual environments, each including an emulation tool configured for emulating the operation of the computer system in the virtual environment, based on the gathered data about the computer systems, and for sending the data about the built virtual environments to the distribution tool; a distribution tool, configured for selecting at least one virtual environment for each computer system and for establishing connection between the said computer system and the virtual environment.

In another embodiment, examples of the data on the computer system can include: the hardware characteristics of the computer system; information on the computing resources of the computer system; information on the software installed on the computer system; information on the computer system's network environment; and information on the physical location of the computer system.

In yet another embodiment, the virtual environment being built can include at least: software which has the same functionality as the software installed on the computer system; having computing resources similar to those of the computer system; having speed of data transfer from the computer system to the virtual environment above the preset threshold value; and functions with the same network environment as the computer system; and has a set of vulnerabilities assigned in advance.

In another embodiment, the virtual environment for the computer system is selected based on a trained model.

In yet embodiment, the virtual environment for the computer system is selected at least so that: the use of the virtual environment's computing resources is lower than the preset threshold, and the speed of data transfer from the computer system to the virtual environment is higher than the preset threshold value.

In another embodiment, the connection for the data transfer between the computer system and the emulation tool is established using a virtual private network.

In yet another embodiment, the distribution tool is additionally configured for establishing connection between the computer system and the virtual environment for transfer of data between the computer system and the chosen virtual environment's emulation tool.

Results are thus achieved by using a method for building a system of honeypot resources; the method including operations which are performed using tools from the honeypot resource system building system. The method can include: data on at least two computer systems are gathered; at least two virtual environments are built, each including an emulation tool configured for emulating the computer system's operation in the virtual environment based on the gathered data on the computer systems; a system of honeypot resources is built, by choosing at least one virtual environment for each above-described computer system, based on the data on the built virtual environments and by establishing connection between the computer system and the virtual environment.

In another embodiment, data on the computer system can include: the hardware characteristics of the computer system; information on the computing resources of the computer system; information on the software installed on the computer system; and information on the computer system's network environment; information on the computer system's physical location.

In yet another embodiment, the virtual environment being built can include: software which has the same functionality as the software installed on the computer system; having computing resources similar to those of the computer system; has a speed of data transfer from the computer system to the virtual environment above the preset threshold value; functions with the same network environment as the computer system; and having a set of vulnerabilities provided in advance.

In another embodiment, the virtual environment for the computer system is chosen based on a trained model.

In yet another embodiment, the virtual environment for the computer system is chosen at least so that: the use of the virtual environment's computing resources is lower than the preset threshold; and the speed of data transfer between the computer system and the virtual environment is higher than a preset threshold value.

In another embodiment, the connection for the data transfer between the computer system and the emulation tool is established using a virtual private network.

In yet another embodiment, connection is established between the computer system and the virtual environment for transfer of data between the computer system and the chosen virtual environment's emulation tool.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
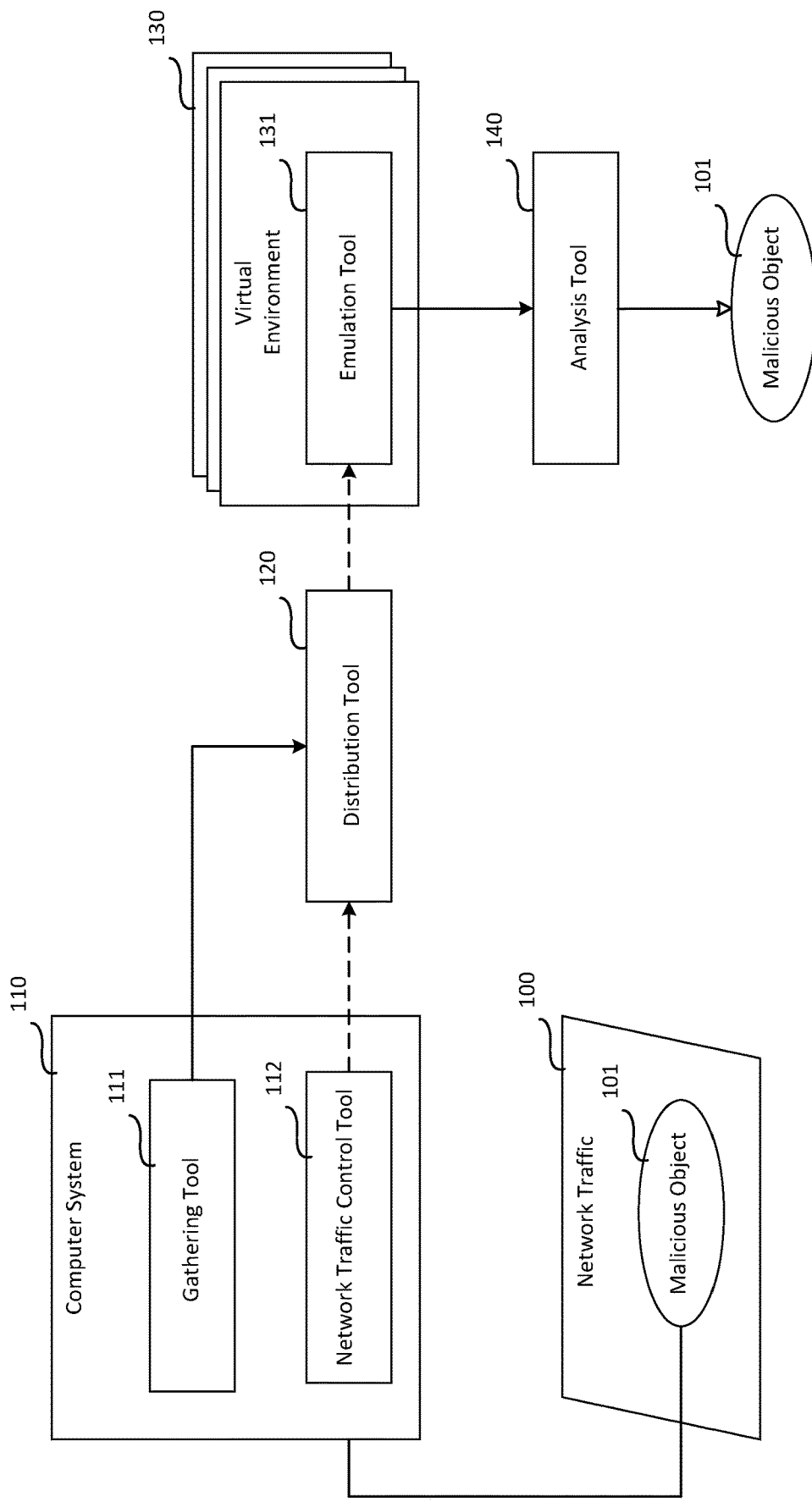
FIG. 1 is a block diagram of a system for detecting a malicious object in network traffic, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following sets forth definitions of terms used herein. These terms are applicable to only the present Application.

Honeypot—a computer system representing a bait for offenders. The purpose of a honeypot is to be subjected to unauthorized research and to gather data on the activity, which subsequently allows for the study the offender's strategy and determining a list of tools which may be used for attacks on actual security objects. The following can be used as such a honeypot computer system: a user's computer system; a server; a website; and/or software (for example, applications for electronic document processing). For example, a web server which does not have a name and technically is not known to anyone, should not, accordingly, have any guests visiting it. Therefore, all persons trying to visit it are potential hackers. A honeypot gathers information on the behavior of such hackers and on their methods for influencing the server. Subsequently, strategies for countering hacker attacks can be developed.

Virtual environment (or a virtual machine (VM))— a software-based or a hardware-based system which emulates the hardware of a platform (a target platform) and executes programs for the target platform on a host platform, or virtualizes a platform and creates environments on it which isolate programs and even operating systems from each other.

Virtualization—provision of a set of computing resources or their logical consolidation, abstracted from hardware realization while providing logical isolation of computing processes executed on the same physical resource from each other. An example of the use of virtualization is the possibility to start multiple operating systems on a single computer: in this case, each of the guest operating systems uses its own set of logical resources (processors, random access memory, storage devices), whose provision from a common pool, accessible at the hardware level, is controlled by a host operating system—a hypervisor.

Turning to FIG. 1, a block diagram of a system for detecting a malicious object in network traffic is depicted, according to an embodiment. In particular, the block diagram of a system for detecting a malicious object in network traffic comprises network traffic 100 including a malicious object 101, a computer system 110 including a gathering tool 111, a network traffic control tool 112, a distribution tool 120, a virtual environment 130 including an emulation tool 131, and an analysis tool 140.

A primary purpose of the system for detecting malicious objects in network traffic (hereinafter referred to as "malicious objects") is to detect said malicious objects, which, once sent to a computer system 110, install themselves in the computer system 110 and begin actively interacting with other installed software. Such detection of malicious objects is performed by emulating the operation of the computer system 110 in a virtual environment 130 built for this purpose. In this manner, an offender, when attacking the computer system 110, infects the bait virtual environment 130, which acts as a honeypot resource.

In one embodiment, the malicious object can include a malicious application; a malicious file; a uniform resource locator (URL), from which at least the following occurs: malicious applications are propagated, and/or a network attack on the computer system is carried out; a network address, from which at least the following occurs: malicious applications are propagated, and/or a network attack on the computer system is carried out.

For example, the following can be sent in the network traffic 100: a malicious program—a keylogger; and instructions for a botnet client.

In yet another example, the network traffic itself does not include the above-described entities (i.e. is safe or conditionally safe), but such entities can get into the network traffic from sources spreading spam, malicious programs, or intrusive advertising, etc. (for example, from specialized servers rented by nefarious operators).

Figure 5:
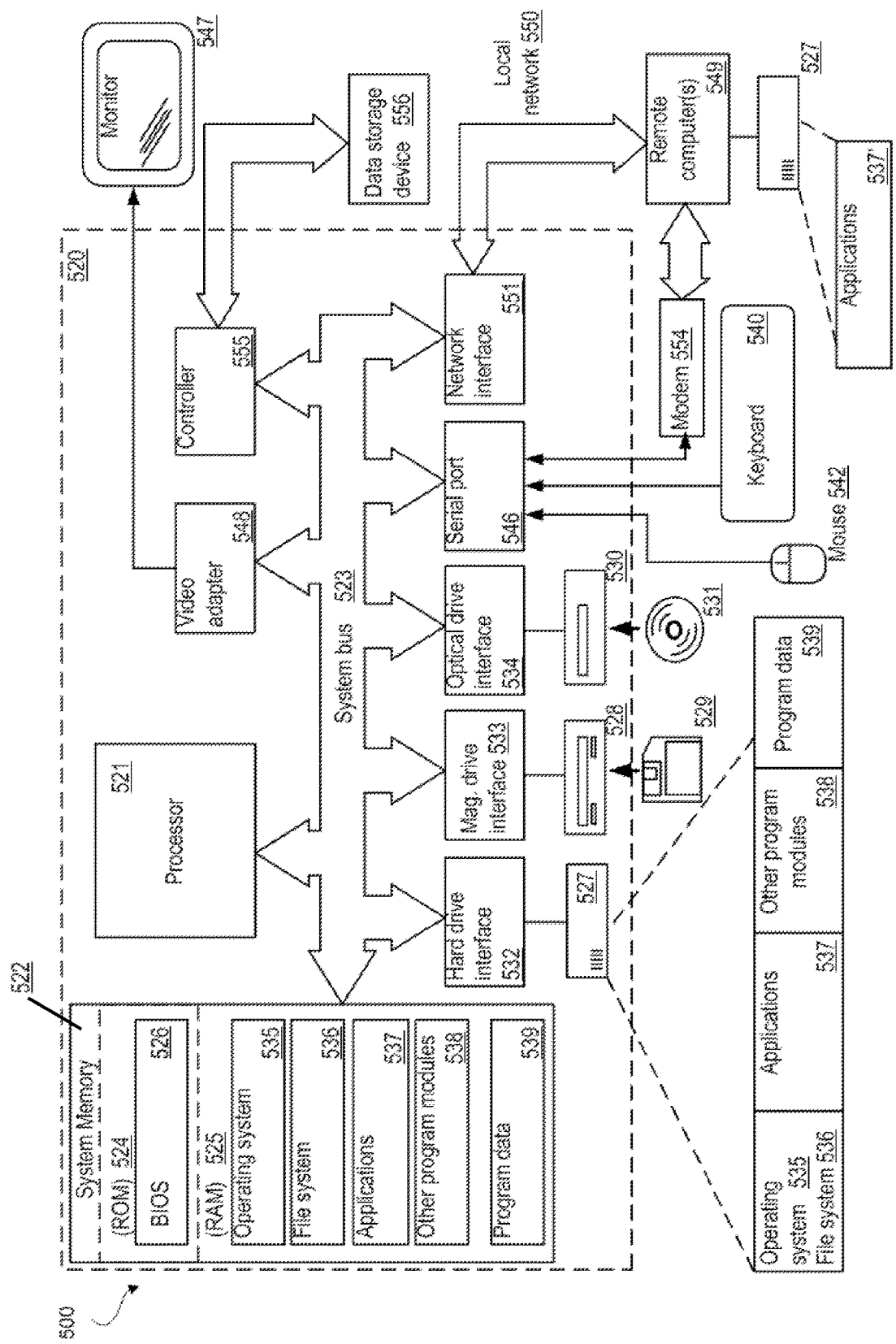
FIG. 5 is a block diagram of a computer system for implementing the systems and methods described herein, according to an embodiment.

In one embodiment, the computer system is represented by system depicted in FIG. 5. The computer system 110 can include, for example: a personal computer; a notebook; a mobile device (such as a smartphone, a smart watch, a tablet, etc.); a server or a distributed server system; a System-on-a-Chip (SoC); and/or other built-in systems.

The system for detection of malicious objects in the network traffic being described includes at least two gathering tools 111, each functioning on a separate computer system 110.

In one embodiment, the virtual environment 130 operates on a server which is not a computer system 110.

The gathering tool 110 is configured for gathering data about the computer system 110 on which the gathering tool 110 operates, and for sending the gathered data to the distribution tool 120.

The gathering of data about the computer system 110 can be done both before interception of the network traffic 100 (for example, during the booting of the operating system), and/or during interception of the network traffic 100. The second case, although requiring more computing resources, allows for the more efficient building of a virtual environment 130, and therefore allows more efficient detection of malicious objects in the network traffic.

In one embodiment, data about the computer system 110 can include: the hardware characteristics of the computer system 110; information about the computing resources of the computer system 110; information about the software installed on the computer system 110; information about the network environment of the computer system 110; and/or information about the physical location of the computer system 110.

For example, data about the computer system can include: random access memory size; the number of hard drives, the total capacity of the hard drives, and the amount of free space on the hard drives; a list of installed software; software versions; and/or name of the processor, video board, peripheral devices, etc.

In yet another example, if an advanced persistent threat (APT) is supposed, then the data about the computer system 110 can be represented directly by an image of the above-mentioned computer system 110. Such an image can be used to build a virtual environment 130 (in which the image is to be deployed). In this manner, the virtual environment 130 can completely emulate the functioning of the operating system 110, which, in turn, can facilitate the detection of malicious objects that are intended exclusively for a specific computer system 110 and which would not be detected in a virtual environment 130 built on a different basis (for example, in a virtual environment emulating the functioning of an average user's computer system).

In yet another embodiment, the gathering tool 111 is additionally configured for gathering data about the functioning of applications on a computer system 110. The functioning of applications can include: information on creation, modification and deletion of files on the computer system 110; information on network connections and on the data sent on a network; and/or information about the users operating the computer system 110.

The distribution tool 120 is configured for choosing a virtual environment 130 from at least two pre-built virtual environments based on the data gathered by the gathering tool 111 about the computer system 110.

In one embodiment, the virtual environment 130 is chosen from pre-built virtual environments. For example, pre-build virtual environments can at least have software installed that has the same functionality as the software installed on the computer system 110; have computing resources similar to those of the computer system 110; have a speed of data transfer from the computer system 110 to the virtual environment 130 that exceeds a preset threshold value; function with the same network environment as the computer system 110; and/or have a set of vulnerabilities assigned in advance.

For example, in order to detect malicious cryptoware programs, which encrypt electronic documents (for example, Microsoft Office documents), relevant applications (such as Microsoft Office) must be installed in the virtual environment 130. To ensure that the virtual environment 130 matches the computer system 110 more accurately, the virtual environment 130 needs to have applications of the same versions as on the computer system 110 (e.g. Microsoft Office 2016) installed.

In another example of detection of exploits (i.e. executable code that uses vulnerabilities of operating systems or applications), the virtual environment 130 must have the same operating system installed as the one on the computer system 110, but with uncorrected vulnerabilities. On the one hand, this approach allows the most accurate reproduction of a computer system 110 with minimal consumption of computing resources, while, on the other hand, allows for the obtaining of malicious objects in the network traffic 100 with the highest probability.

In another embodiment, the virtual environment 130 is chosen from pre-built virtual environments, based on a pre-trained model. In yet another embodiment, the pre-trained model represents a group of rules. The rules can be related to the choice of a virtual environment 130; and/or the building of a virtual environment 130 for the assigned computer system 110.

A trained model is built using machine learning methods. For example, neural networks; error correction methods; back-propagation methods; support vector machine methods; boosting methods; and/or Bayesian networks can be utilized. A particular example of a trained model is the trained distribution model 330 presented in the description of FIG. 3.

For example, for various types of malicious objects, various virtual environments 130 may be pre-built with respective software and characteristics. To detect vulnerabilities in the virtual environment 130, an operating system and software with uncorrected vulnerabilities is installed. To detect cryptoware programs, software for electronic document turnover and for working with media data is installed. To detect spam mailings, software for working with social networks is installed, and so on.

In another example, various virtual environments 130 can be assigned various computing resources, such as random access memory, space on a hard drive, or processor performance (controlled by allocated processor time frames). Therefore, a virtual environment 130 configured for detection of certain types of malicious objects uses a minimally required amount of computing resources. This approach allows additional virtual environments 130 to be built and supported on one server, which, in turn, provides more flexibility in choosing between different virtual environments 130 for the assigned computer system 110.

In another example, in addition to the building of virtual environments 130 for assigned types of malicious objects, virtual environments 130 can be built for certain groups of users, such as: a group of average users, i.e. users working with popular software and performing the most frequent actions on computer systems 110; a group of users working with electronic documents; a group of users working with video and audio data; and/or a group of users working with databases, etc.

Accordingly, a maximum number of target audiences with a minimal use of computing resources (allocated for the functioning of virtual environments 130) can be covered. Also, for specific users, computer systems 110, or actions taken by users on the said computer systems 110, separate virtual environments can be built. As discussed above, this approach is the most efficient one for detecting malicious objects used for advanced persistent threats (APTs).

In another embodiment, the distribution tool 120 is additionally configured for choosing a virtual environment 130 on the basis of the characteristics of intercepted network traffic 100.

In yet another embodiment, the characteristics of intercepted network traffic can include a uniform resource locator (URL), from which network traffic 100 comes to the computer system 110; network address, from which network traffic 100 comes to the computer system 110; and/or hash sums calculated on the basis of the content of the network traffic 100.

The network traffic control tool 112 is configured for intercepting the network traffic 100 of the computer system 110 and for sending it to the emulation tool 131 in the chosen virtual environment 130.

In one embodiment, the network traffic control tool 112 is a driver working on the computer system 110. In another embodiment, the gathering tool 111 and the network traffic control tool 112 are provided in the form of a thin client.

In yet another embodiment, the network traffic control tool 112 additionally sends the intercepted network traffic 100 to other software running on the computer system 110. In this manner, it becomes possible to intercept network traffic 100 and to use the intercepted intercept network traffic 100 for subsequent emulation of the operation of the computer system 110 in the virtual environment 130, while allowing the user to continue using the computer system 110.

In yet another embodiment, the network traffic 100 interception tool is additionally configured for: filtering the network traffic 100 on the basis of the data about the source of the network traffic 100, the content of the network traffic 100, etc.; categorizing the network traffic 100 on the basis of the filtration results; and subsequent sending of the network traffic, depending on the chosen category, to the emulation tool 131 running in the virtual environment 130 or to other software running on the computer system 110.

For example, all network packets from the network traffic 100 whose source is known and included in the list of authorized addresses are categorized as safe network packets and are thus sent to other software running on the computer system 110. Conversely, all network packets whose source is unknown or included in the list of prohibited addresses are categorized as potentially dangerous and are sent to the emulation tool 131 running in the virtual environment 130.

In another example, a user visits a site using a browser and receives site content from the server. The network traffic from the server that stores the site's pages includes both the code of the site's page and links to resources used by the page. In an embodiment, one of the links is a link to a malicious javascript. The link is then found to be unsafe. As a result, the network traffic control tool 112 sends data from the network traffic 100 to the browser without the data from the said link, but sends the full traffic to the emulation tool 131.

In another embodiment, the intercepted network traffic 100 is sent to the emulation tool 131 using a virtual private network (VPN). Virtual environments 130 can run either on a single computer device (for example, on a single server) or on multiple computer devices (building a distributed computer system and a distributed systems of virtual environments 130).

The emulation tool 131 is configured for emulating the functioning of a computer system 110 in a virtual environment 130 on the basis of data from intercepted network traffic 100 and transfer of the results of the emulation of the functioning of the computer system to the analysis tool 140.

In one embodiment, the emulation tool 131 comprises virtualization software. For example, the emulation tool 131 can comprise such software as Microsoft Hyper-V, VMware Server, VMware Workstation, VirtualBox, etc.

The analysis tool 140 is configured for detecting a malicious object 101 in a virtual environment 130 based on analysis of the results of the emulation of the functioning of the computer system 110.

In one embodiment, the analysis tool 140 comprises anti-virus software. Accordingly, the analysis tool can utilize at least static analysis (e.g. analysis of programs for maliciousness based on data included in the files of the programs being analyzed). In an embodiment, static analysis can include, for example, signature analysis. In an embodiment, signature analysis includes a search for matches between any part of the code of the programs being analyzed and a known code (signature) from the database of malicious programs' signatures). In an embodiment, signature analysis can include utilization of lists of authorized and prohibited applications as a search for calculated checksums from the programs being analyzed (or their parts) in a database of checksums of malicious programs (lists of prohibited programs) or a database of checksums of safe programs (lists of authorized programs).

In embodiments, the analysis tool 140 can utilize dynamic analysis. In an embodiment, dynamic analysis includes analysis of programs for maliciousness based on data obtained during execution or emulation of the programs being analyzed. In an embodiment dynamic analysis can include, for example, heuristic analysis. In an embodiment, a heuristic analysis can include emulation of the functioning of the programs being analyzed, creation of emulation logs (including data on calls for API functions, transmitted parameters, parts of the code of the programs being analyzed, etc.) and search for any matches of data from the created logs to data from the database of behavior signatures of malicious programs. In an embodiment, dynamic analysis can include, for example, proactive protection as interception of calls for API functions of the programs being analyzed, creation of behavior logs of the programs being analyzed (including data on calls for API functions, transmitted parameters, parts of the code of the programs being analyzed, etc.) and search for any matches of data from the created logs to data from the database of calls for malicious programs.

In yet another embodiment, analysis tool 140 can further build and provide a flow of URL/IP addresses to outside security solutions (anti-virus software, network filters, etc.). In another embodiment, analysis tool 140 can further add URL addresses with malicious software to cloud services, in order to protect users who use anti-virus products.

Figure 2:
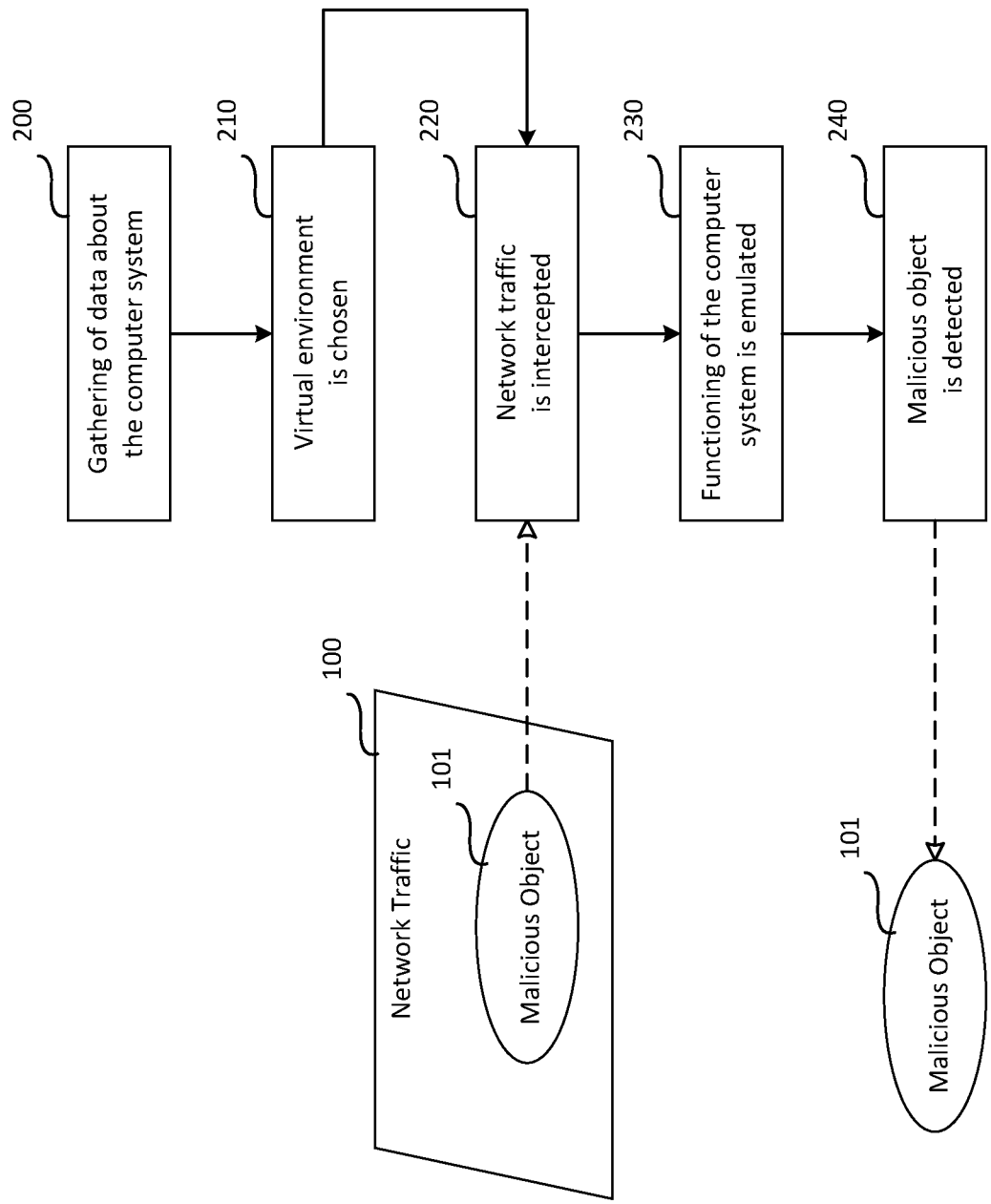
FIG. 2 is a flowchart of a method for detecting a malicious object in network traffic, according to an embodiment.

Referring to FIG. 2, a flowchart of a method for detecting a malicious object in network traffic is depicted, according to an embodiment. The method for detecting a malicious object in network traffic includes 200 in which data about the computer system are gathered, 210 in which a virtual environment is chosen, 220 in which network traffic is intercepted, 230 in which the computer system's functioning is emulated, and 240 in which a malicious object is detected.

At 200, using the gathering tool 111, data about the computer system 110 are gathered.

At 210, using the distribution tool 120, a virtual environment 130 is chosen from at least two pre-built virtual environments, based on the gathered data about the computer system 110. In an embodiment, 200 and 210 can be performed before the beginning of 220 (for example, during the loading of an operating system or the launch of an application, such as a browser); during 220 (for example, while an application is running which actively generates network traffic, such as a browser when loading a site page); and/or after 220 is completed.

At 220, using the traffic network control tool 112, the network traffic of the computer system 110 is intercepted.

At 230, using the emulation tool 131, the functioning of the computer system 110 is emulated in the virtual environment 130, based on data from the intercepted network traffic 100.

At 240, using the analysis tool 140, a malicious object 101 is detected in the virtual environment 130, based on analysis of the results of the emulation of the functioning of the computer system 110.

Figure 3:
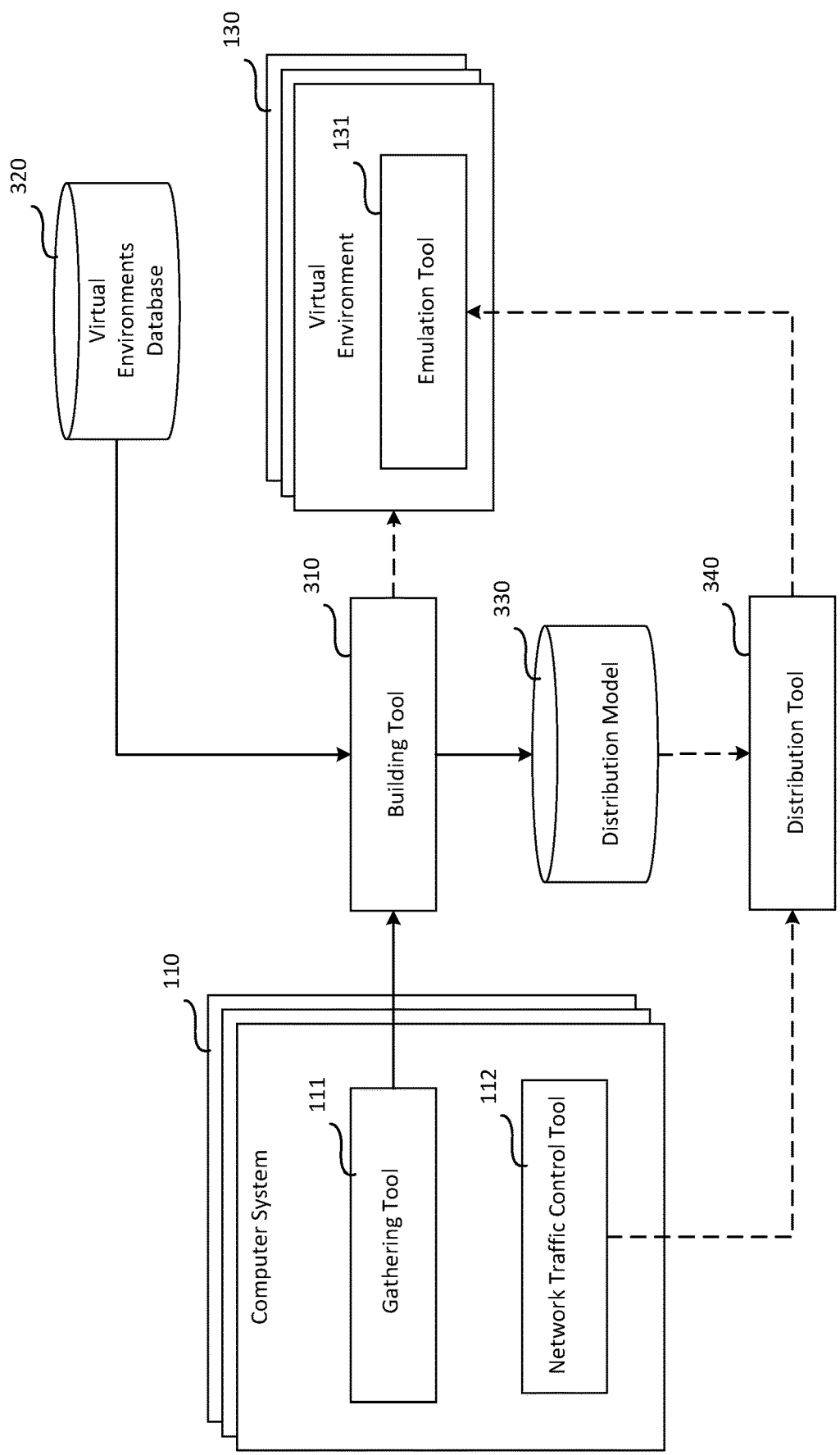
FIG. 3 is a block diagram of a system for building a system of honeypot resources, according to an embodiment.

Referring to FIG. 3, a block diagram of a system for building a system of honeypot resources is depicted, according to an embodiment. The block diagram of a system for building a system of honeypot resources generally includes a building tool 310, a virtual environments database 320, a distribution model 330, a distribution tool 340, computer systems 110, each including a gathering tool 111 and a network traffic control tool 112, and virtual environments 130, each including an emulation tool 131.

One of the purposes of a honeypot building system is to provide a system for distribution of virtual environments 130 between computer systems 110, which ensures efficient detection of malicious objects 101 from network traffic 100, because each computer system 110 is assigned the most suitable virtual environment 130. Advantageously, the total use of computing resources by the system being described is reduced, and, further, the rate of detection of malicious files 101 in the virtual environment 130 specially configured for this purpose is increased.

In an embodiment, a system for building a honeypot system includes at least two computer systems 110. For example, details on the computer system 110 are provided in FIG. 1.

In one embodiment, the building tool 310, the distribution tool 340 and the virtual environments 130 run on separate servers. In another embodiment, the building tool 310 and the virtual environments 130 run on the same servers, while the computer systems 110 and the distribution tool 340 run on other computer systems. In such an embodiment, the computer system 110 and the distribution tool 340 can run on the same computer system.

For example, a user computer can be a computer system 110 that runs a distribution tool 340, which establishes connection with a remote server that runs a building tool 310 and a virtual environment 130 built by the building tool 310.

Previously, data are gathered about each computer system 110, using a gathering tool 111.

In one embodiment, data about the computer system 110 can include the hardware characteristics of the computer system; information about the computing resources of the computer system 110; information about the software installed on the computer system 110; information about the network environment of the computer system 110; and/or information about the physical location of the computer system 110.

The building tool 310 is configured for building at least two virtual environments 130, each including an emulation tool 131 configured for emulating the functioning of the computer system 110 in the virtual environment 130 based on the gathered data about the computer systems 110 and for transferring of data about the built virtual environments to the distribution tool 340.

In one embodiment, the virtual environment 130 is built according to the following characteristics: contains software that has the same functionality as the software installed on the computer system 110; has computing resources similar to those of the computer system 110; has a speed of data transfer from the computer system 110 to the virtual environment 130 that exceeds a preset threshold value; functions with the same network environment as the computer system 110; and/or has a set of vulnerabilities assigned in advance.

In another embodiment, the virtual environment 130 is built according to the following characteristics: based on elements of previously built virtual environments stored in the virtual environments database 320 (for example, in the form of images), where at least the following act as virtual environment elements: components of an operating system running in a virtual environment, applications running in a virtual environment, operating system settings, application settings; and/or data (such as electronic documents, media data, etc.). Further, the virtual environment 130 is built according to the following additional characteristics: by choosing one of the virtual environments stored in the virtual environments database 320; and/or based on pre-built rules for building virtual environments.

In another embodiment, the building of the virtual environment 130 for one computer system 110 influences the building of the virtual environment 130 for another computer system 110. For example, virtual environments 130 for computer systems 110 can be built so that they do not exceed, when running, the allocated computing resources of the server (on the condition that the built virtual environments 130 will work on the same server).

The building tool 310 is additionally configured for training the distribution model 330 based on data about the computer systems 110 and on the built virtual environments 130. For example, during the subsequent selection using the distribution tool 340 using the distribution model 330 of virtual environments 130, the distribution model 330 is trained such that tasks are performed for the assigned computer systems, where, at least: the rate of detection of malicious objects of various types in the chosen virtual environments 130 would be the highest; the time for the transfer of network traffic 100 between the computer systems 110 and the virtual environments 130 would be minimal; and/or the load (i.e. the use of computing resources, machine time consumption, electric energy consumption, etc.) on the virtual environment 130 would be below preset threshold values.

For example, the building tool 310 can be used to train the distribution model 330 based on the previously built virtual environments 130, which were used for detecting Windows operating system exploits in the network traffic 100.

In another example, the building tool 310 can be used to re-train the distribution model 330 using the results of the functioning of the analysis tool 140 (e.g. see FIG. 1). For example, such re-training is done to reduce the time for the transfer of network traffic 100 between computer systems 110 and virtual environments 130. Accordingly, for this purpose, the virtual environments 130 are chosen at shorter network distances to the computer systems 110.

The building of a virtual environment 130 for a specific computer system 110 (the building of a virtual environment 130 based on data about the functioning of the computer system 110) ensures more accurate emulation of the functioning of the computer system 110, which, in turn, increases the rate of detection of malicious applications 101.

For example, in case of a targeted attack on a computer system 110, an insufficiently accurate emulation of the computer system 110 functioning may prevent the triggering of the malicious functionality of the malicious application 101 contained in the network traffic 100. In turn, detection of the malicious application is prevented. The more accurately the operation of the computer system 110 is emulated, the higher is the chance of detecting a malicious application configured for running on the computer system, and/or the higher is the chance of determining the malicious functionality of such application.

The distribution tool 340 is configured for building a system of honeypots. Such building includes choosing, for each computer system 110, at least one virtual environment 130 based on data about the built virtual environments 130 and establishing connection between the computer system 110 and the virtual environment 130 for transfer of data between the computer system 110 and the emulation tool 131 for emulating the chosen virtual environment 130.

In one embodiment, the virtual environment 130 for the computer system 110 is selected on the basis of a trained model 330.

In another embodiment, the virtual environment 130 for the computer system 110 is selected at least so that: the usage of computing resources of the virtual environment 130 would be below a preset threshold; and/or the speed of data transfer from the computer system 110 to the virtual environment 130 would exceed a preset threshold value.

In yet another embodiment, the virtual environment 130 for the computer system 110 is chosen on the basis of the types of malicious objects expected to be detected in the network traffic 100. For example, efficient detection of malicious cryptoware programs and exploits requires two custom-built virtual environments 130. Therefore, the distribution tool 340 can choose, for an assigned computer system 110, two virtual environments 130 at once, to which the network traffic 100 intercepted by the network traffic control tool 112 will be sent (e.g. see FIG. 1).

Therefore, in one embodiment, the distribution tool 340 is configured to choose, for the assigned computer systems 110, the kind of virtual environments 130 that maximize the rate of detection of malicious objects of various types. In an embodiment, the distribution tool 340 is configured to choose, for the assigned computer systems 110, the kind of virtual environments 130 that minimize the time for the transfer of network traffic 100 between the computer systems 110 and the virtual environments 130. In an embodiment, the distribution tool 340 is configured to choose, for the assigned computer systems 110, the kind of virtual environments 130 that ensure that the load on the virtual environments 130 (i.e. the use of computing resources, machine time consumption, electric energy consumption, etc.) is below preset threshold values.

In an embodiment, distribution of virtual environments 130 between computer systems 110 allows for spreading of the computing load more efficiently between the tasks of emulating the functioning of the computer systems 110. Accordingly, more complex and resource-consuming emulation algorithms can be utilized, which in turn increases the efficiency (accuracy) of the emulation of the computer systems 110.

In another embodiment, the connection for the data transfer between the computer system 110 and the emulation tool 131 is established using a virtual private network (VPN).

In yet another embodiment, additionally, depending on the result of the functioning of the analysis tool 140 for the virtual environment 130 (e.g. see FIG. 1), the building tool 310 is used to make a decision to re-train the distribution model 330 so that the choice of virtual environments 130 for the computer system 110 based on data about the computer system 110 or about the network traffic 100 performs the aforementioned tasks more efficiently.

Figure 4:
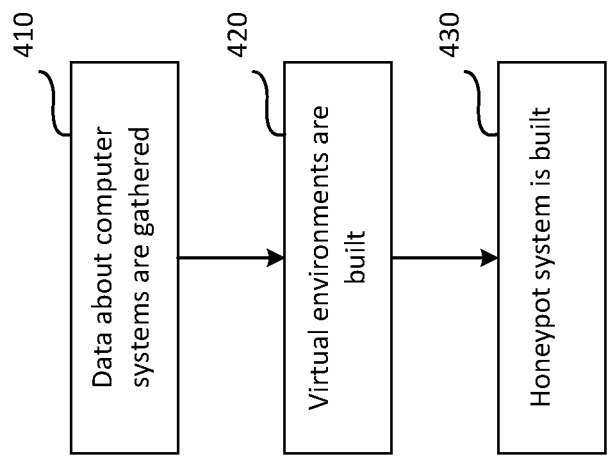
FIG. 4 is a flowchart of a method for building a system of honeypot resources, according to an embodiment.

Referring to FIG. 4, a flowchart of a method for building a system of honeypot resources is depicted, according to an embodiment. The method for building a system of honeypot resources depicted in FIG. 4 includes 410 in which data about the computer systems are gathered, 420 in which virtual environments are built, and 430 in which a system of honeypot resources is built.

At 410, using the gathering tool 111, data about at least two computer systems 110 are gathered. At 420, the building tool 310 is used to build at least two virtual environments 130, each including an emulation tool 131 configured for emulating the operation of the computer system 110 in the virtual environment 130, on the basis of the gathered data about the computer systems 110. At 430, the distribution tool 340 is used to build a system of honeypots. For example, 430 can include choosing, for each computer system 110, at least one virtual environment 130 based on the data about the built virtual environments 130 and establishing connection between the computer system 110 and the virtual environment 130 for transfer of data between the computer system 110 and the emulation tool 131 for emulating the chosen virtual environment 130.

Referring to FIG. 5, a diagram illustrating in greater detail a computer system 500 on which aspects of the disclosure as described herein may be implemented according to various embodiments is depicted.

The computer system 500 can comprise a computing device such as a personal computer 520 includes one or more processing units 521, a system memory 522 and a system bus 523, which contains various system components, including a memory connected with the one or more processing units 521. In various embodiments, processing units 521 can include multiple logical cores that are able to process information stored on computer readable media. The system bus 523 is realized as any bus structure known at the relevant technical level, including, in turn, a bus memory or a bus memory controller, a peripheral bus and a local bus, which is able to interact with any other bus architecture. The system memory can include non-volatile memory such as Read-Only Memory (ROM) 524 or volatile memory such as Random Access Memory (RAM) 525. The Basic Input/Output System (BIOS) 526 contains basic procedures ensuring transfer of information between the elements of personal computer 520, for example, during the operating system boot using ROM 524.

Personal computer 5620, in turn, has a hard drive 527 for data reading and writing, a magnetic disk drive 528 for reading and writing on removable magnetic disks 529, and an optical drive 530 for reading and writing on removable optical disks 531, such as CD-ROM, DVD-ROM and other optical media. The hard drive 527, the magnetic drive 528, and the optical drive 530 are connected with system bus 523 through a hard drive interface 532, a magnetic drive interface 533 and an optical drive interface 534, respectively. The drives and the corresponding computer information media represent energy-independent means for storage of computer instructions, data structures, program modules and other data on personal computer 520.

The system depicted includes hard drive 527, a removable magnetic drive 529 and a removable optical drive 530, but it should be understood that it is possible to use other types of computer media, capable of storing data in a computer-readable form (solid state drives, flash memory cards, digital disks, random-access memory (RAM), etc.), connected to system bus 523 through a controller 555.

The computer 520 comprises a file system 536, where the recorded operating system 535 is stored, as well as additional program applications 537, other program engines 538 and program data 539. The user can input commands and information into the personal computer 520 using input devices (keyboard 540, mouse 542). Other input devices (not shown) can also be used, such as: a microphone, a joystick, a game console, a scanner, etc. Such input devices are usually connected to the computer system 520 through a serial port 546, which, in turn, is connected to a system bus, but they can also be connected in a different way—for example, using a parallel port, a game port or a Universal Serial Bus (USB). The monitor 547 or another type of display device is also connected to system bus 523 through an interface, such as a video adapter 548. In addition to monitor 547, personal computer 520 can be equipped with other peripheral output devices (not shown), such as speakers, a printer, etc.

Personal computer 520 is able to work in a network environment; in this case, it uses a network connection with one or several other remote computers 549. Remote computer(s) 549 is (are) similar personal computers or servers, which have most or all of the above elements, noted earlier when describing the substance of personal computer 520 shown in FIG. 5. The computing network can also have other devices, such as routers, network stations, peering devices or other network nodes.

Network connections can constitute a Local Area Network (LAN) 550 and a Wide Area Network (WAN). Such networks are used in corporate computer networks or in corporate intranets, and usually have access to the Internet. In LAN or WAN networks, personal computer 520 is connected to the Local Area Network 550 through a network adapter or a network interface 551. When using networks, personal computer 520 can use a modem 554 or other means for connection to a world area network, such as the Internet. Modem 554, which is an internal or an external device, is connected to system bus 523 through serial port 546. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for building a honeypot environment, the system comprising:
a first computing device including a first gathering tool, the first gathering tool configured to collect data about the first computing device;
a second computing device including a second gathering tool, the second gathering tool configured to collect data about the second computing device, wherein the second computing device is independent of the first computing device;
a building tool configured to:
build a plurality of virtual environments, wherein each virtual environment includes an emulator configured to emulate at least one of the first computing device or the second computing device based on the data collected about the first computing device or the data collected about the second computing device, and transfer data about the built plurality of virtual environments to a distribution tool; the distribution tool configured to:
select at least one of the plurality of virtual environments for association with the first computing device based on data about the plurality of virtual environments,
select at least one of the plurality of virtual environments for association with the second computing device based on data about the plurality of virtual environments, and
establish connections between the computing devices and the respective virtual environments associated with the computing devices.

2. The system of claim 1, wherein the building tool is configured to establish connections between the computing devices and the respective virtual environments associated with the computing devices including by:
establishing a connection between the first computing device and the at least one virtual environment associated with the first computing device, wherein the connection facilitates transfer of additional information collected from the first gathering tool to the emulator included in the at least one virtual environment associated with the first computing device; and
establishing a connection between the second computing device and the at least one virtual environment associated with the second computing device, wherein the connection facilitates transfer of additional information collected from the second gathering tool to the emulator included in the at least one virtual environment associated with the second computing device.

3. The system of claim 2, wherein the distribution tool is further configured to:
after the connection between the first computing device and the at least one virtual environment associated with the first computing device is established, further emulate the first computing device using the additional information using the emulator of the at least one virtual environment associated with the first computing device.

4. The system of claim 1, wherein the emulator configured to emulate the first computing device emulates at least one of:
substantially similar software functionality as the first computing device;
substantially similar computing resources as the first computing device;
a speed of data transfer between the first computing device and the at least one virtual environment associated with the first computing device exceeding a speed threshold;
operation on a same network as the first computing device; or
a predefined set of vulnerabilities.

5. The system of claim 1, wherein the distribution tool is further configured to select the at least one of the plurality of virtual environments for association with the first computing device according to:
a usage of computing resources of the at least one of the plurality of virtual environments being below a usage threshold; and
a speed of data transfer between the first computing device and the at least one of the plurality of virtual environments being above a speed threshold.

6. The system of claim 1, wherein the building tool is further configured to train a distribution model, and wherein the distribution tool is further configured to select the at least one of the plurality of virtual environments for association with the first computing device based on the distribution model.

7. The system of claim 1, further comprising:
a network control tool configured to intercept network traffic related to the first computing device,
wherein the building tool is further configured to emulate the first computing device based on the intercepted network traffic.

8. The system of claim 7, wherein the first gathering tool is configured to collect the data about the first computing device prior to the network control tool intercepting network traffic or after the network control tool has completed intercepting network traffic.

9. The system of claim 1, wherein the building tool is further configured to build a first virtual environment of the plurality of virtual environments and a second virtual environment of the plurality of virtual environments such that computing resources used by the combination of the first virtual environment and the second virtual environment do not exceed a threshold of allocated computing resources.

10. The system of claim 1, wherein the distribution tool is configured to select the at least one of the plurality of virtual environments for association with the first computing device according to at least one of:
a rate of detection of malicious objects in the at least one associated virtual environment is above a rate detection threshold;
a time for transfer between the first computing device and the at least associated virtual environment is below a transfer threshold; or
a load on the at least associated virtual environment is below a load threshold.

11. A method for building a honeypot environment, the method comprising:
collecting data about a computing system, wherein the computing system includes a gathering tool configured to collect data about the computing system;
selecting at least one of a plurality of pre-built virtual environments for association with the computing system based on the data collected about the computing system, each of the pre-built virtual environments including an emulator configured to emulate the computing system;
intercepting network traffic of the computing system;
emulating the computer system in the selected at least one of the plurality of pre-built virtual environments using the emulator; and
detecting at least one malicious object from the intercepted network traffic based on the emulating.

12. The method of claim 11, further comprising:
establishing a connection between the computing system and the at least one of the plurality of pre-built virtual environments associated with the computing system;
collecting additional data about the computing system; and
transferring the additional information to the emulator for the emulating of the computer system.

13. The method of claim 11, wherein selecting at least one of a plurality of pre-built virtual environments for association with the computing system is based on:
a usage of computing resources of the at least one of the plurality of pre-built virtual environments being below a usage threshold; and
a speed of data transfer between the computing system and the at least one of the plurality of pre-built virtual environments being above a speed threshold.

14. The method of claim 11, further comprising:
training a distribution model, wherein the distribution tool is further configured to select the at least one of the plurality of pre-built virtual environments for association with computing system based on the distribution model.

15. The method of claim 11, wherein selecting at least one of a plurality of pre-built virtual environments for association with the computing system is based on at least one of:
a rate of detection of malicious objects in the at least one associated virtual environment is above a rate detection threshold;
a time for transfer between the first computing device and the at least associated virtual environment is below a transfer threshold; or
a load on the at least associated virtual environment is below a load threshold.

16. The method of claim 11, wherein the collecting data and the selecting the at least one of the plurality of pre-built virtual environments are performed at least one of:
before the intercepting of network traffic of the computing system;
during loading of an operating system of the computing system;
during launch of an application of the computing system;
during the intercepting of network traffic of the computing system; or
after the intercepting of network traffic of the computing system.

17. A system for building a honeypot environment, the system comprising:
a virtual environments database configured to store a plurality of previously-built virtual environments;
a distribution model including a plurality of characteristics selected by at least one machine learning method;
computing hardware of at least one processor and a memory operably coupled to the at least one processor; and
instructions that, when executing on the computing hardware, cause the computing hardware to implement:
a building tool configured to:
build a plurality of virtual environments, wherein each virtual environment includes an emulator configured to emulate at least one computing system, and
train the distribution model based on the plurality of previously-built virtual environments, and
a distribution tool configured to select at least one of the plurality of virtual environments for association with a respective computing system based on the distribution model.

18. The system of claim 17, wherein the instructions that, when executing on the computing hardware, cause the computing hardware to further implement:
a gathering tool configured to collect data about the respective computing system,
wherein the emulator of the at least one of the plurality of virtual environments associated with the respective computing system is configured to emulate the respective computing system.

19. The system of claim 18, wherein the building tool is further configured to retrain the distribution model based on a result of an analysis tool configured to detect a malicious object in the emulator of the at least one of the plurality of virtual environments associated with the respective computing system.

20. The system of claim 17, wherein the plurality of previously-built virtual environments were previously built by the building tool to detect a malicious object in previous network traffic.

21. The system of claim 17, wherein the distribution tool is configured to select the at least one of the plurality of virtual environments for association with a respective computing system according to at least one of:
- a rate of detection of malicious objects in the at least one associated virtual environment is above a rate detection threshold;
- a time for transfer between the respective computing system and the at least associated virtual environment is below a transfer threshold; or
- a load on the at least associated virtual environment is below a load threshold.

* * * * *